United States Patent
Lee et al.

(10) Patent No.: US 11,405,735 B2
(45) Date of Patent: Aug. 2, 2022

(54) SYSTEM AND METHOD FOR DYNAMICALLY ADJUSTING SETTINGS OF AUDIO OUTPUT DEVICES TO REDUCE NOISE IN ADJACENT SPACES

(71) Applicant: FUJIFILM Business Innovation Corp., Tokyo (JP)

(72) Inventors: Matthew Len Lee, Mountain View, CA (US); Chelhwon Kim, Palo Alto, CA (US); Patrick Chiu, Mountain View, CA (US); Miteshkumar Patel, Foster City, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/903,149

(22) Filed: Jun. 16, 2020

(65) Prior Publication Data
US 2021/0392451 A1 Dec. 16, 2021

(51) Int. Cl.
*H04R 29/00* (2006.01)
*H04R 3/00* (2006.01)
(Continued)

(52) U.S. Cl.
CPC ........... *H04R 29/001* (2013.01); *G06F 3/165* (2013.01); *G10L 25/51* (2013.01); *H04R 3/00* (2013.01); *H04R 2430/01* (2013.01)

(58) Field of Classification Search
CPC ...... H04S 7/301; H04S 7/307; H04S 2400/01; H04S 7/303; H04S 2400/11; H04S 7/302; H04S 7/305; H04S 2420/01; H04S 2400/15; H04S 3/008; H04S 7/308; H04S 2420/03; H04S 7/00; H04S 7/30; H04S 7/304; H04S 7/40; H04S 1/007; H04S 2400/13; H04S 3/00; H04S 3/002; H04S 7/306; H04S 2400/07; H04S 2420/07; H04S 2420/13; H04R 3/04; H04R 2227/005; H04R 3/12; H04R 27/00; H04R 29/007; H04R 5/02; H04R 29/001; H04R 2227/003; H04R 3/005; H04R 5/04; H04R 2420/07; H04R 1/406; H04R 2205/024; H04R 2430/20; H04R 29/002; H04R 2227/007; H04R 29/008; H04R 5/027; H04R 2430/01;
(Continued)

(56) References Cited

U.S. PATENT DOCUMENTS 6,754,546 B1 * 6/2004 Hindus ............... H04L 12/1813
348/14.01
8,995,687 B2 3/2015 Marino, Jr. et al.
(Continued)

OTHER PUBLICATIONS

Focusonics.com, NEUROtechnology, [online], 4 pgs. URL: https://www.focusonics.com/.

*Primary Examiner* — Lun-See Lao
(74) *Attorney, Agent, or Firm* — Procopio, Cory, Hargreaves & Savitch LLP

(57) ABSTRACT

A computer-implemented method, comprising detecting a first audio output in a first room, and detecting a portion of the first audio output in a second room, determining whether the portion of the first audio output in the second room meets a trigger requirement, and for the determining that the portion meets the trigger requirement, providing an action to reduce the portion of the first audio input in the second room.

17 Claims, 7 Drawing Sheets

(51) Int. Cl.
*G10L 25/51* (2013.01)
*G06F 3/16* (2006.01)

(58) Field of Classification Search
CPC .......... H04R 5/033; H04R 1/028; H04R 1/26;
H04R 1/403; H04R 2201/401; H04R
2201/405; H04R 2410/01; H04R 2420/05;
H04R 2430/03; H04R 2499/11; H04R
2499/15; H04R 3/14; H04R 1/02; H04R
1/04; H04R 1/22; H04R 1/288; H04R
1/32; H04R 2205/021; H04R 2420/09;
H04R 2460/07; H04R 25/407; H04R
29/004; H04R 29/005; H04R 1/025;
H04R 1/026; H04R 1/10; H04R 1/1008;
H04R 1/1016; H04R 1/24; H04R
2201/028; H04R 2203/12; H04R 2400/01;
H04R 2410/05; H04R 2430/23; H04R
25/02; H04R 25/30; H04R 25/405; H04R
25/43; H04R 25/552; H04R 29/00; G10K
11/178; G10K 11/17823; G10K 11/17853;
G10K 11/17855; G10K 11/1787; G10K
2210/108; G10K 2210/3011; G10K
2210/3025
USPC .................. 381/56–58, 104–109; 700/94
See application file for complete search history.

(56) References Cited

U.S. PATENT DOCUMENTS

| | | | |
|---|---|---|---|
| 9,094,496 B2* | 7/2015 | Teutsch | H04M 9/082 |
| 9,106,192 B2 | 8/2015 | Sheen et al. | |
| 9,445,196 B2* | 9/2016 | Gaensler | H04R 3/02 |
| 9,787,273 B2 | 10/2017 | Iyer | |
| 9,866,964 B1* | 1/2018 | Haskin | H04R 27/00 |
| 2007/0266395 A1* | 11/2007 | Lee | H04H 60/31 |
| | | | 725/11 |
| 2020/0296521 A1* | 9/2020 | Wexler | H04R 25/505 |
| 2021/0029452 A1* | 1/2021 | Tsoi | H04L 65/4069 |

* cited by examiner

SYSTEM AND METHOD FOR DYNAMICALLY ADJUSTING SETTINGS OF AUDIO OUTPUT DEVICES TO REDUCE NOISE IN ADJACENT SPACES

BACKGROUND

Field

Aspects of the example implementations relate to methods, systems and user experiences associated with dynamically adjusting settings of audio output devices to reduce noise in adjacent spaces.

Related Art

In related art environments, sounds and voices may carry over from one room or area to an adjacent room or area. Such carryover may disturb occupants of one of the rooms with unwanted noise from the other of the rooms. Related art approaches do not provide a way of estimating how much of the sound that is generated in one room, such as by a person or a device, carries over to the other room.

According to one related art situation, in a residential home, a sleeping child may be one room, and a parent may be in a nearby room, watching a movie on television. For example, the sleeping child may be in a bedroom next to the person in a living room. Sound generated by the television in the living room may carry over to the bedroom, and disturb the sleeping child. Further, sound generated by the television in the living room may carry over to another adjacent space, such as a sensitive neighbor, a person conference call room, or anyone who does not wish to be disturbed by the noise of the television.

In the related art environment, the issue is difficult to address, because sound volume, frequency and rhythm can be dynamic. Measuring the sound transfer to another space at one time point may not accurately reflect a measurement at another time, because the sound varies in volume, frequency and rhythm.

In the foregoing related art environment example of the television, the sound levels change dynamically and often dramatically across scenes, quiet dialogue, or loud explosions or actions. Setting the volume of the movie based on the opening scene may be too high, due to the noise created during loud scene, or too low thus reducing the enjoyment of watching the television.

Additionally, sound transfer may also vary based on changes in the environment, such as an open door, heating vent, temperature, humidity, pressure etc. For example, when opening a door to the bedroom, the sound transfer from the television in the living room increases. Setting the volume when the door is closed will be too loud for when the door is open, while setting the volume when the door is open may reduce the potential for noise, but may reduce the enjoyment of watching television.

Related art approaches that attempt to automatically adjust sound source to a precise level to keep the transfer of the sound and acceptable level may also encounter challenges. For example, the sound source may be unknown. In other words, the device and room that needs to be adjusted, or the precise level of reduction, might require multiple attempts at checking and listening in the adjacent space.

There is therefore an unmet need in the art to dynamically and automatically adjust specific sound sources, such as devices and/or the environment, to maintain a sound transfer below a certain threshold from one space to another.

SUMMARY

According to an aspect of the example implementations, a computer-implemented method is provided, comprising detecting a first audio output in a first room, and detecting a portion of the first audio output in a second room; determining whether the portion of the first audio output in the second room meets a trigger requirement; and for the determining that the portion meets the trigger requirement, providing an action to reduce the portion of the first audio input in the second room Example implementations may also include a non-transitory computer readable medium having a storage and processor, the processor capable of executing instructions associated with dynamically adjusting settings of audio output devices to reduce noise in adjacent spaces.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Figure 1:
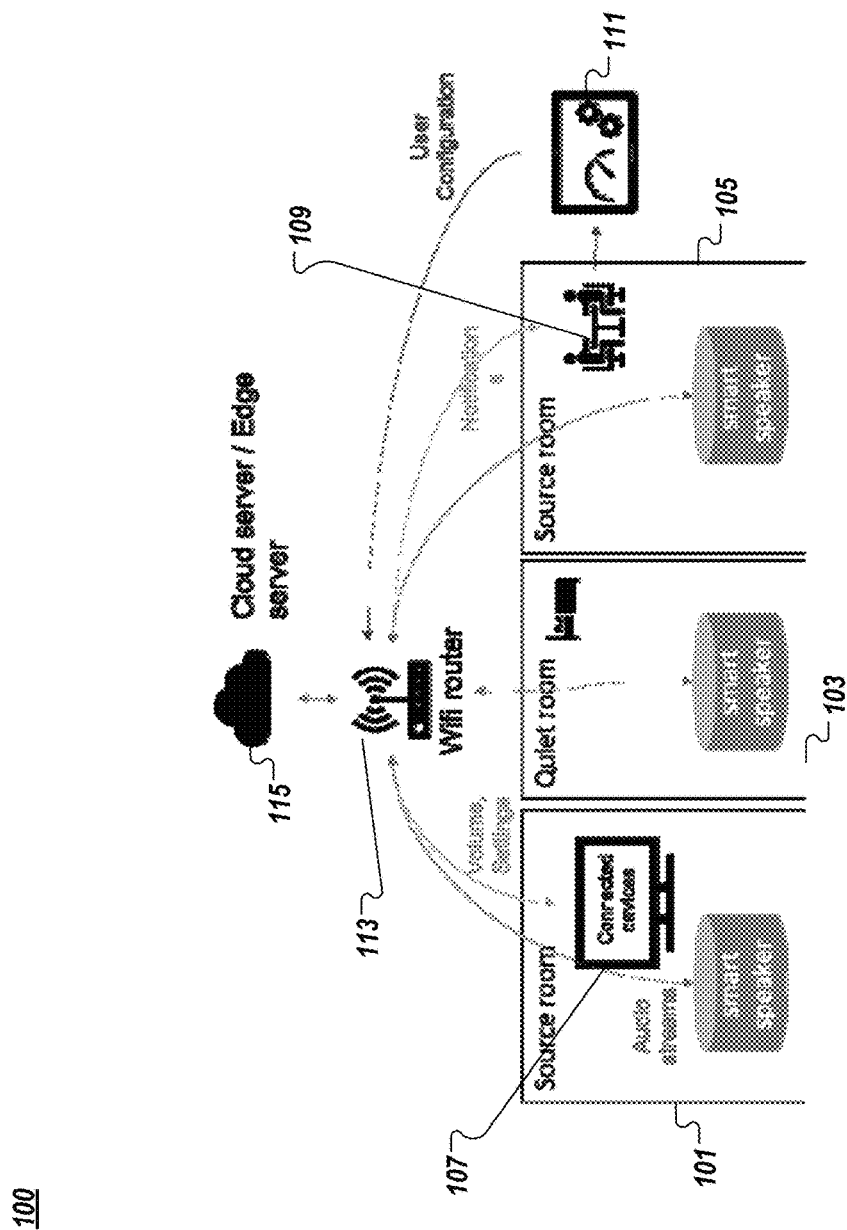
FIG. 1 is a functional block diagram of an example implementation.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to the use of intelligent—enabled speakers, sensors and a user interface for setting preferences. More specifically, the example implementations include dynamic and automatic adjustment of the specific sound source, such as devices, smart or otherwise, and/or the environment, to maintain sound transfer below a threshold, from one space to another.

According to the example implementations, smart speakers with microphones that are placed in rooms estimate sound transfer from one space to another. The room where the sound is generated may be referred to herein as a "source room", and the room where the sound or noise is to be minimized may be referred to herein as a "quiet room". For example, but not by way of limitation, the source room made the living room or a conference room, and the quiet room may be a bedroom or an adjacent conference room. Each of the rooms may have a smart speaker with a microphone, which can sense sounds that are audible in that room.

By analyzing the audio streams of the source room and the quiet room, the example implementations detect how much of the sound in the quiet room can be accounted for by the source room. The analysis may consider the volume, frequency and pattern of the audio streams to identify how much of the source sound is present in the quiet room.

In a first use case, the quiet room may not itself have a source of sound. Accordingly, the sounds detected by the smart speaker in the quiet room are entirely originating from noise associated with the source room. If the noise associated with the source room that is sensed in the quiet room is above a threshold of volume, frequency and/or rhythm level, an action may be invoked to reduce the noise in the quiet room to below a threshold.

However, the quiet room may also generate some sounds. For example, the quiet room may generate the sound of snoring, white noise or the like. In such a circumstance, a determination must be made as to which components of the audio stream in the quiet room come from within the quiet room itself, and which components of the noise come from the source room. Here, the example implementations may subtract the audio streams of the source room, which may optionally be multiplied by attenuation factor, from the audio stream of the quiet room.

The resulting difference would be an estimate of the sound originating from the source room. Conversely, a similar sensing may be performed from the source room, such that the resulting difference would be an estimate of the sound originating from the quiet room. In both of these cases, if the difference results in a noise estimate that is above a threshold of volume, frequency and/or rhythm level, an action may be invoked to reduce noise to be below the threshold.

While the foregoing example implementations are directed to situations where there is a source room and a quiet room, the present example implementations are not limited thereto. For example but not by way of limitation, there may be more than one source room, such that noises may be coming from multiple source rooms, such as a living room, kitchen, washing machine room or the like, adjacent to the quiet room. Alternatively, there may be multiple quiet rooms, such as bedrooms, such that the noise may be originating from a single source room and being transmitted to multiple quiet rooms, such as multiple bedrooms adjacent to one another.

FIG. 1 is a functional block diagram 100 of an example implementation. More specifically, a plurality of rooms are shown. Here, a source room 101 has an adjacent wall with a quiet room 103, and the quiet room 13 has another wall adjacent to another source room 105. Each of the rooms as a smart speaker position therein, which has an audio sensor, such as a microphone, to sense the audio within that room. Further, as shown in the source room 101, one or more connected devices 107 (e.g., television but not thereto) provided with room. Further, the noise within the room may be caused by connected devices 107, or by other sources, such as one or more persons that may be speaking as shown at 109.

The smart speakers in each of the rooms 101, 103, 105 communicates with a Wi-Fi router 113. Accordingly, the audio streams are transmitted to the Wi-Fi router 113, which in turn, may transmit signals to a cloud server or server 115. Alternatively, a processor may be associated with the Wi-Fi router that can perform the operations described herein.

Additionally, one or more users may control settings associated with the example implementations via a user interface such as a dashboard 111.

The Wi-Fi router 113 may transmit signals back to the smart speakers each of the rooms 101, 103, 105. For example, the Wi-Fi router 113 may transmit audio streams to the smart speakers, controls on volumes or other settings to the connected devices 107, or notifications to devices associated with the user 109.

Thus, smart speakers or other devices within the realms may detect and estimate sources of noise. Actions may be invoked to reduce noise, and the threshold programs associated with the detection, estimation and control of noise may be controlled by the user. Further, the system may be automatically calibrated.

As explained above, the example implementations may make a determination that the sound level in the quiet room exceeds a threshold, such as a user configured threshold. Accordingly, one or more actions may be invoked to reduce the noise below the threshold. For example, but not by way of limitation, a notification may be generated for a user in the source room. That notification may provide an indication to reduce the volume, frequency or rhythm of sounds originating from the source room by a certain amount, to reduce the noise to below the threshold. For example but not by way of limitation, the notification may be delivered by a smart speaker, via a mobile device, a display in the room, or other modalities as would be understood by those skilled in the art.

In addition to the foregoing example action, other actions may be invoked. For example, but not by way of limitation, the maximum volume or other sound characteristics of the smart speaker may be reduced to a specific level in the source room, the equalization of an audio playing device may be adjusted in a manner that reduces the sound characteristics that carry over (e.g., bass, treble, etc.), or the maximum volume or other sound characteristic may be reduced to a specific level of other smart connected devices in the source room, such as a smart TV, computer, tablet, phone, speakerphone, doorbells, or the like.

Another example action that may be invoked include adjustment of the orientation of a directional speaker to avoid transfer of sound to the quiet room. The adjustment may direct audio output directly to the user, or direct the audio output toward a wall that is not adjacent to the quiet room, to prevent unnecessary transfer.

According to this example implementation, directional speaker may be programmatically movable, such as on a gimbal connected to a server. Alternatively, an action that may be provided to power off, or change settings for, connected devices in the source room, such as appliances including a washing machine or blender, doorbells or the like.

The action may also include activity at the quiet room. For example and not by way of limitation, a white noise generator may be triggered to provide an output at a level, playback white noise, run a fan or HVAC at a level, or the like, in the quiet room. This action may have the effect of reducing or eliminating the ability of the user in the quiet room to hear the noise from outside of the quiet room.

In the foregoing example implementations, the system may sense and perform action in a closed loop, until the noise is below a threshold when connected devices are the source of the noise.

The actions may be determined manually, automatically, randomly, or in any other means as would be understood by those art. Further, one or more actions may be performed in series, parallel or a combination thereof.

In addition to being triggered by a threshold of a noise level, the example implementations may also be triggered based on events. For example, sensing events within rooms may trigger one or more actions. Events may be detected, either within the source room or the quiet room, or both, that may temporarily change a volume of devices in one or both rooms. For example but not by way of limitation, in a source room, a user may be watching television, and receive a phone call. The example implementations may detect the phone call, and automatically reduce the volume of television during the call, and then, automatically increase the volume of the television after the call has been terminated.

According to another example use case, in a workplace office, there may be two adjacent office rooms. A user in the first office may be listening to music, when a user in the second office, which is the quiet room, receives a phone call. To preserve the privacy of the phone conversation in the second office, an action is taken to temporarily increase the volume of the music in the first office to a slightly higher level, so that the user in the first office cannot hear the voice conversation in the adjacent office. Alternatively, the action may include playing ambient music in the second office, which mixes voice sounds from the phone call, so that the voice transferred to the first office is harder to detect and decipher.

In the foregoing example implementations, phone calls or video calls may be either detected by speech patterns, such as one-sided talking, or programmatically. For example but not by way of limitation, APIs on the user's phone or video call account may programmatically provide the necessary detection to trigger the actions. Similarly, in the case of in person conversations or meetings, such as in a conference room, speech patterns may similarly be detected to trigger an action.

According to the example implementations, the user may control the thresholds. For example, a user may manually activate the system, such as with a voice command, or automatically, by placing the smart speaker in a mode, such as "do not disturb". Similarly, the user may be provided with a user experience, such as a dashboard that may be accessible, such as by web interface or. Accordingly, the user may configure the noise threshold in a dashboard for each room.

The user may also use the dashboard to connect to smart devices, such as those on the network or associated with the user, that might generate noise, assign where those devices are placed, and specify limits on actions that can be taken on devices. For example but not by way of limitation, a user may permit the volume of a television to be reduced by a maximum amount, such as 50%, or to never allow action to lower the volume low prescribed volume, in order to avoid a or experience of viewing and listening to a program.

Further, according to the example implementation, a calibration may be performed. More specifically, calibration may estimate how well different sounds transfer into adjacent spaces. A sound "test pattern" may be played by the television in the source room, so as to cover various values of volume, frequency and rhythm. At the same time, smart speaker in the quiet room may sense how well those sounds are attenuated or transmitted from the source.

As a result, a unique profile of the noise transfer wall/room can be generated, may be used to determine which sounds are likely to cause noise in the quiet room. Thus, an action may be triggered only when those sounds are detected, the equalization of the sound source may be adjusted to minimize transmissible sounds, or a user may be preemptively warned to avoid certain media, such as a loud program on a television, that may generate those types of sounds.

Figure 2:
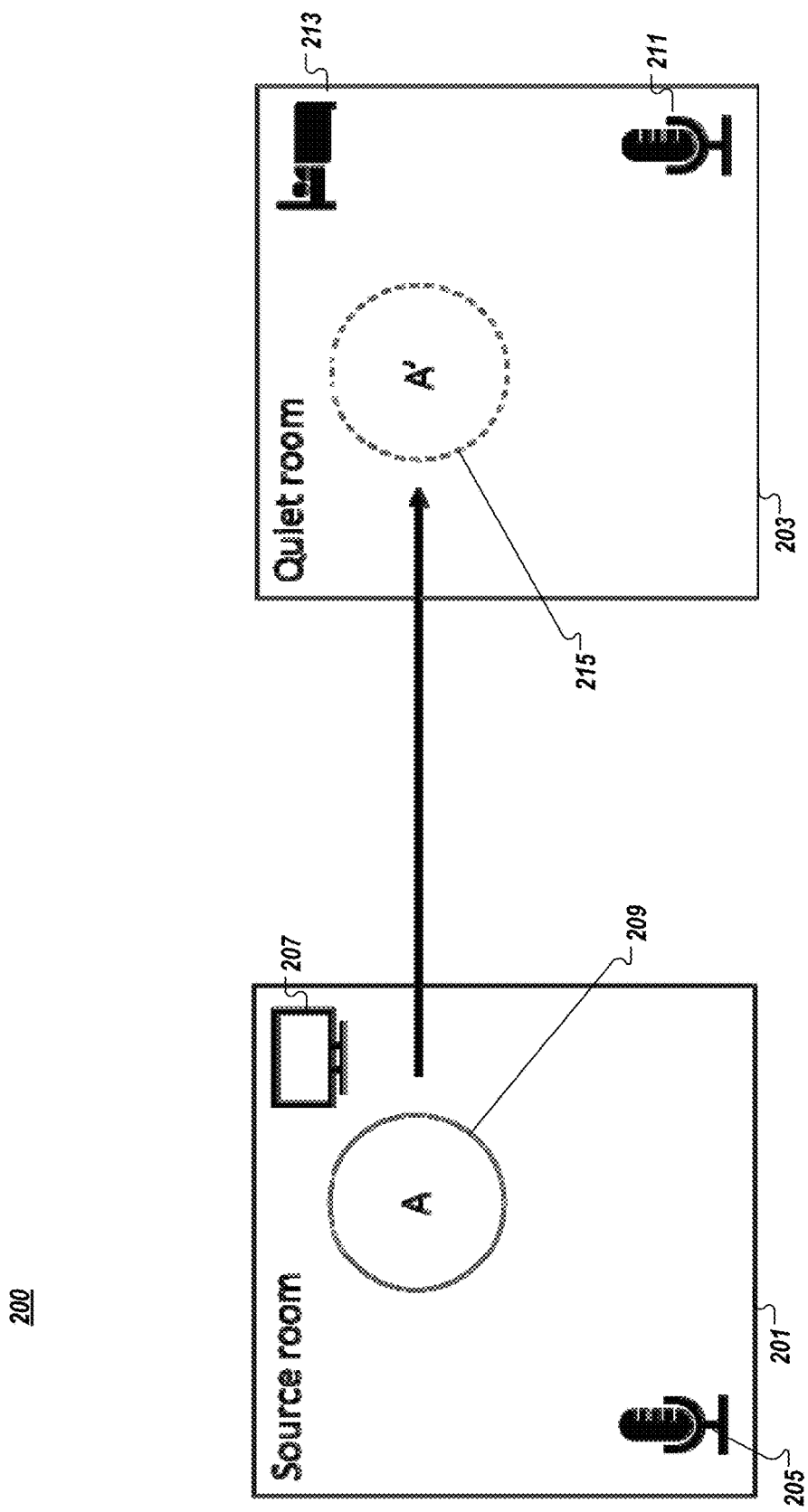
FIG. 2 is a functional block diagram of an example implementation associated with use of an audio stream in the quiet room to measure a noise level from the source room.

FIG. 2 is a functional block diagram of an example implementation 200 associated with use of an audio stream in the quiet room to measure noise level from the source room. More specifically, a source room 201 and a quiet room 203 are disclosed. In the source room 201, a device 207 generates an output, and a microphone 205 (e.g., smart speaker) senses the output of the device 207. The audio stream of the source room is identified as A at 209.

For the quiet room 203, assuming that no sound is generated from within the quiet room itself, a microphone 211 (e.g., smart speaker) may sense audio received in the quiet room, identified as A' at 215. A user may be present in the quiet room, such as in a bed 213.

If the value of A' exceeds a threshold, such as a threshold determined by the user, then a determination may be made to take an action. The action, as explained herein, may adjust the value of A at 209, the source of the noise, in a manner that reduces the sound within the quiet room represented by A' at 215 to a value that is at or below the threshold.

Figure 3:
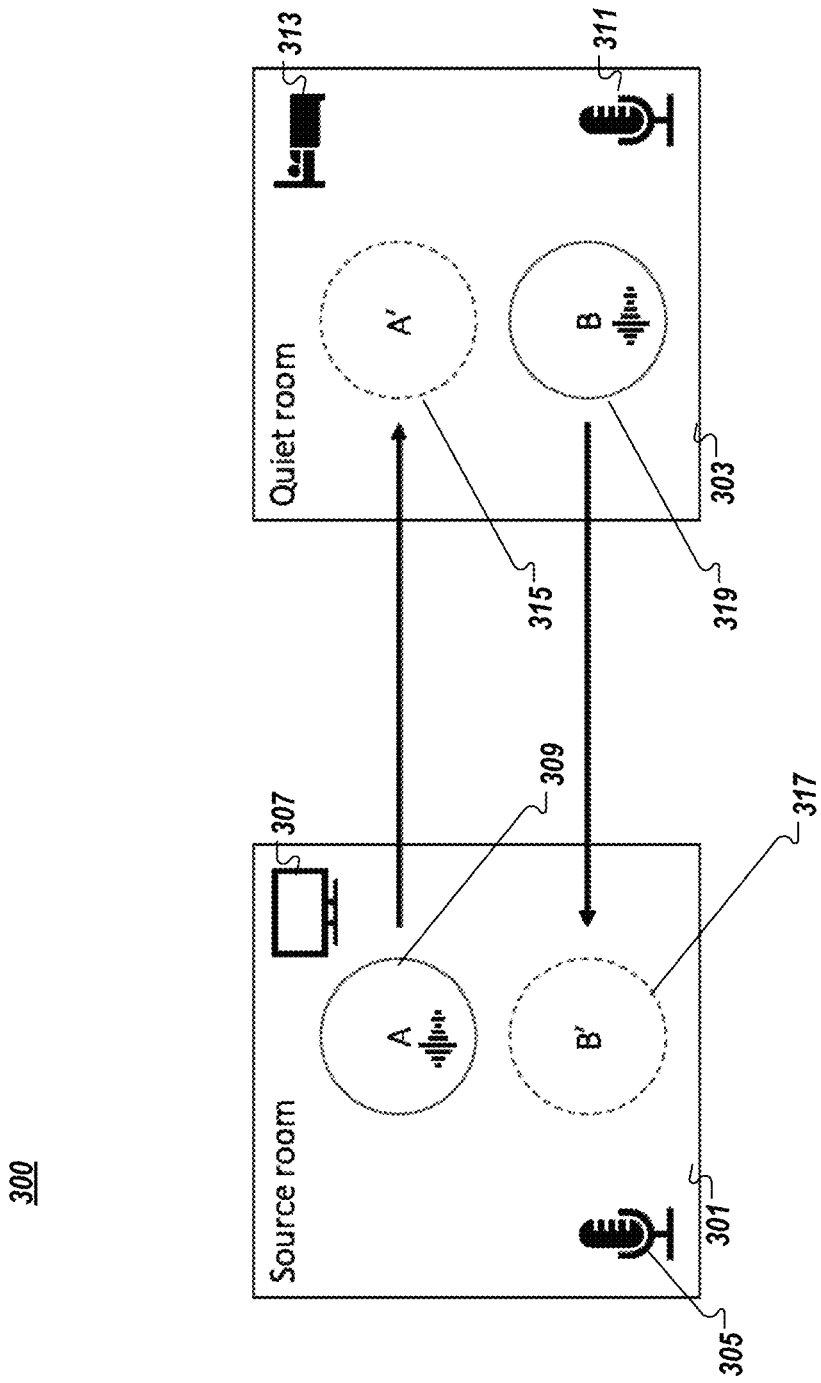
FIG. 3 is a functional block diagram of an example implementation associated with, for the quiet room and the source room both generating noise, and estimating the component of the audio stream that comes from the source room, to determine whether actions in the source room would reduce noise.

FIG. 3 is a functional block diagram of an example implementation 300 associated with use of an audio stream in the quiet room to measure noise level from the source room. More specifically, a source room 301 and a quiet room 303 are disclosed. In the source room 301, a device 307 generates an output, and a microphone 305 (e.g., smart speaker) senses the output of the device 307. The audio stream of the source room is identified as having components A at 309, representative of sound generated in the source room 301, and B' at 317, representative of noise from the quiet room 303.

For the quiet room 303, sound is generated from within the quiet room itself as indicated by B at 319. For example, but not by way of limitation, a lullaby may be playing on a radio, to help a baby sleep in the quiet room 303. A microphone 311 (e.g., smart speaker) may sense audio received in the quiet room as noise from the source room, identified as A' at 315. A user may be present in the quiet room, such as in a bed 313.

By observing the audio stream from each of the speakers, an estimate can be generated of sound from the other space. Then, subtraction may be performed to determine which noise is from the other space and which noise is from the room, which in turn can be used to determine whether the noise from the other room exceeds a threshold.

For the source room 301, an estimation of the sound generated in the source room is generated as $Aest=S-\alpha Q$, wherein $S=(A+B')$, and a represents an attenuation factor (e.g., a factor associated with the transfer of sound between a first room and a second room, as determined during calibration). Various profiles may be generated for the audio output devices in various rooms, and based on various wall materials, thicknesses, etc. It is noted that $Q=(B+A')$. For the quiet room 303, an estimation of the sound generated in the source room is generated as $Best=Q-\alpha S$. Further, a value of $A'est=Q-Best=(B+A')-Best$.

If the value of A'est exceeds a threshold, such as a threshold determined by the user, then a determination may be made to take an action. The action, as explained here, may adjust the value of A at 309, the source of the noise, in a manner that reduces the sound within the quiet room represented by A' at 315 to a value that is at or below the threshold.

Figure 4A:
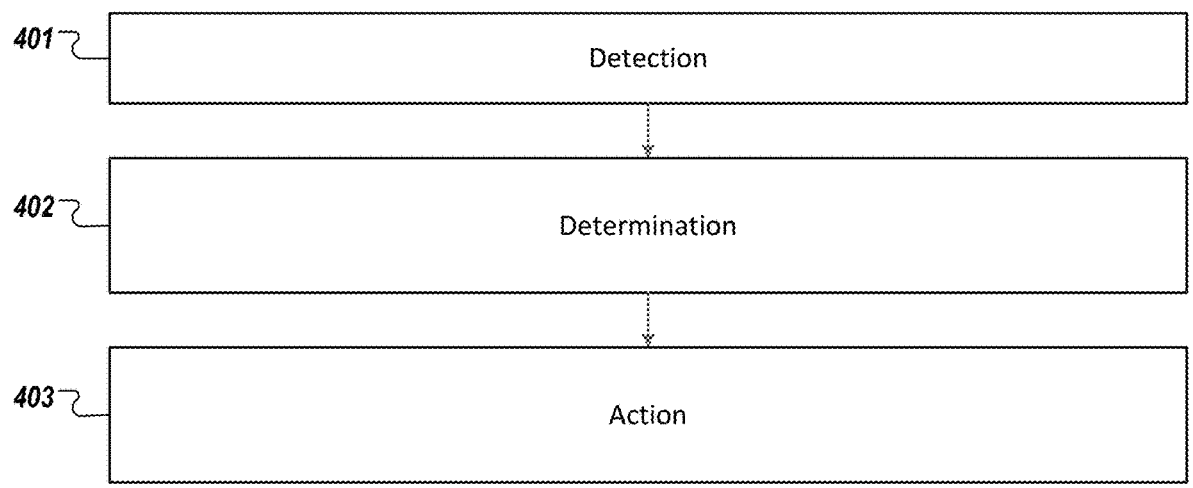
FIGS. 4A and 4B are flowcharts of an example implementation of a method according to the disclosure.

FIGS. 4A and B are a flowcharts of an embodiment of a method for according to the disclosure. A method 400 can be implemented by one or more processors in a computing environment (e.g., the computing environment described below). As shown in FIG. 4A, the method 400 can be a combination of multiple subprocesses, including detection in real time sounds and identification of source of sound components in a first room and a second room at 401, determination of a condition associated with a trigger at 402, and invoking of an action based on the trigger at 403.

Figure 4B:
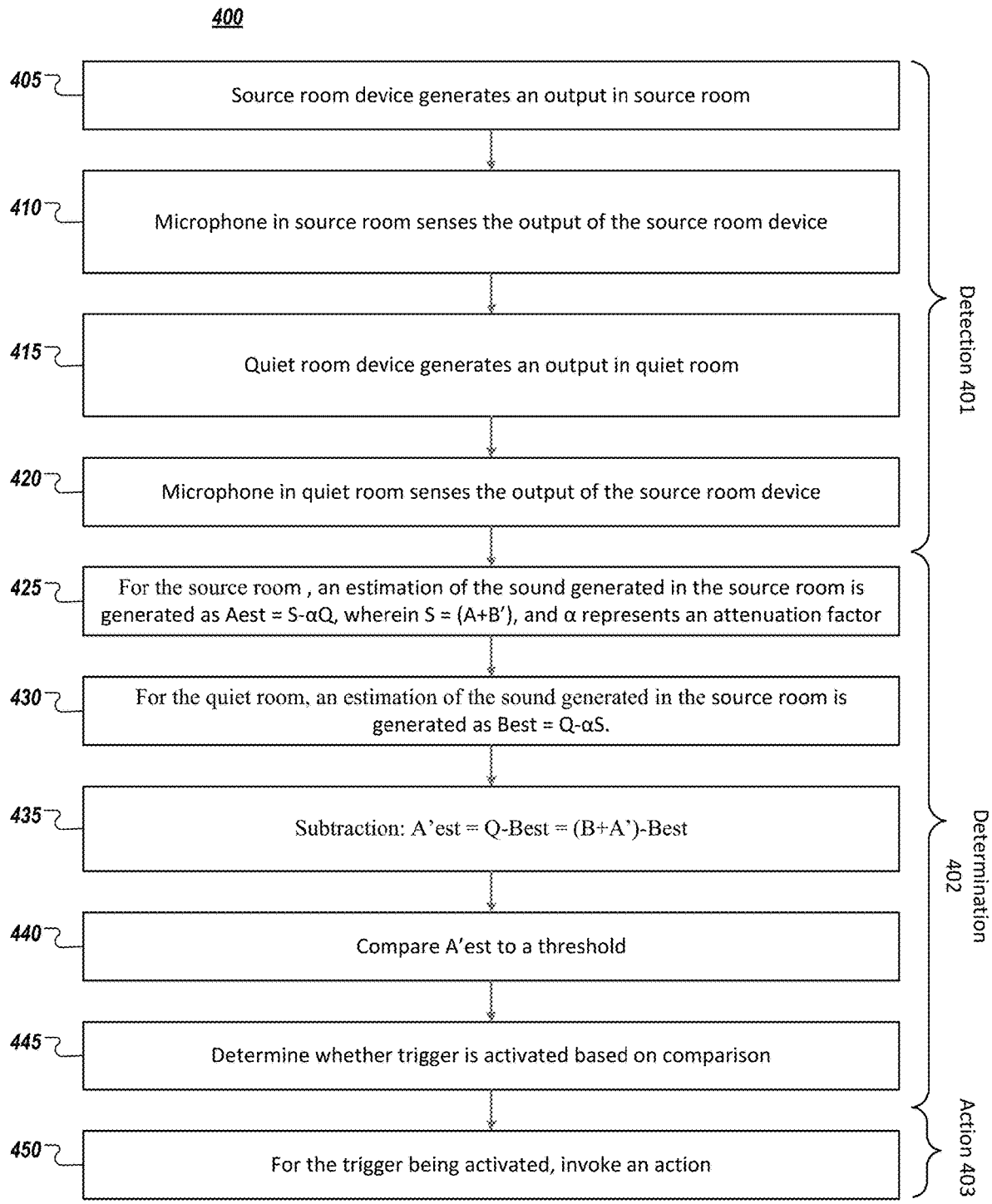

In more detail, FIG. 4B illustrates further details of the detection 401, determination 402, and action 403, according to the method 400 of the example implementation. Elements 405-420 represent additional details associated with the detection 401, elements 425-445 represent additional details associated with the determination 402, and element 450 represents additional details associated with the action 403.

At block 405, a source room device generates an output in the source room. Alternatively, the output may be a source that is not generated by a device, but is generated by a person speaking or making noise.

At block 410, a microphone in the source room senses the output of the source room device. More specifically, the sound is detected in real time, and the source of the sound component is identified.

At block 415, a quiet room device generates an output quiet room. Alternatively, the output may be a source that is not generated by a device, but is generated by a person speaking or making noise.

At block 420, a microphone in the quiet room senses the output of the quiet room device. More specifically, the sound is detected in real time, and the source of the sound component is identified.

At block 425, for the source room, an estimation is generated with respect to the sound generated in the source room, subtracting out the sound from the quiet room multiplied by an attenuation factor.

At block 430, for the quiet room, an estimation is generated with respect to the sound generated in the quiet room, subtracting out sound generated in the source firm.

At block 435, for the quiet room, and estimate is generated with respect to the sound generated in the source room that is received by the quiet room.

At block 440, a comparison is made between the level of noise generated in the source room that is received by the quiet room, to determine whether that value exceeds a threshold, which may be a user determined threshold.

At block 445, based on the results of the comparison, a determination is made as to whether a trigger has been activated.

At block 450, for the trigger being activated, an action is invoked.

Figure 5:
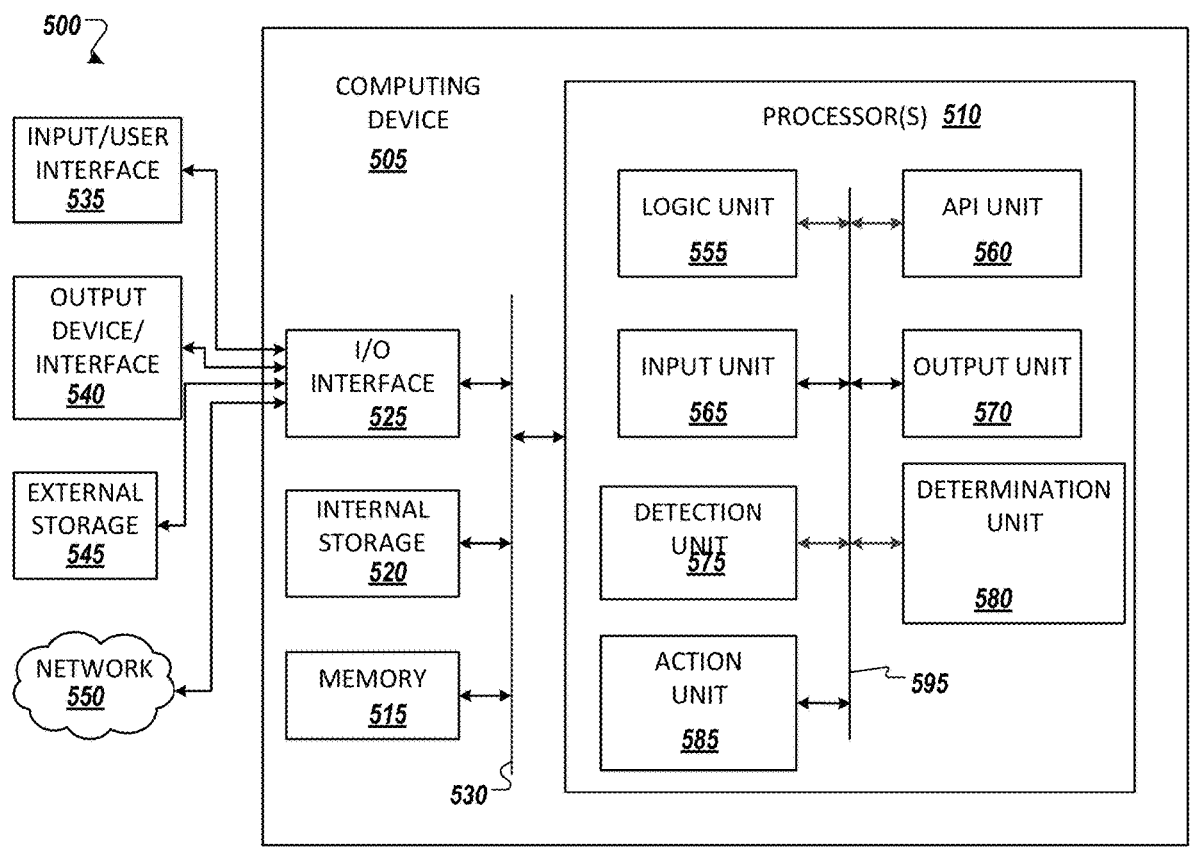
FIG. 5 is a functional block diagram of an example implementation of a computing environment according to the disclosure.

FIG. 5 is a functional block diagram of an embodiment of a computing environment according to the disclosure. A computing environment 500 with an example computer device 505 suitable for use in some example implementations. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computing device 505. The environment 500 can support operations associated with the system 100, for example.

According to the present example implementations, the processing associated with the neural activity may occur on a processor 510 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 505 can be communicatively coupled to input/interface 535 and output device/interface 540. Either one or both of input/interface 535 and output device/interface 540 can be a wired or wireless interface and can be detachable. Input/interface 535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 540 may include a display, television, monitor, printer, speaker, braille, or the like. In some example implementations, input/interface 535 (e.g., user interface) and output device/interface 540 can be embedded with, or physically coupled to, the computing device 505. In other example implementations, other computing devices may function as, or provide the functions of, an input/interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as, a server, client, thin server, general machine, special-purpose machine, or another label. For example but not by way of limitation, network 550 may include the blockchain network, and/or the cloud.

I/O interface 525 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 510 can execute under any operating system (OS) (not shown), in a native or virtual environment. One or more applications can be deployed that include logic unit 555, application programming interface (API) unit 560, input unit 565, output unit 570, detection unit 575, determination unit 580, prediction unit 585, and inter-unit communication mechanism 595 for the different units (e.g., the encode 110 and the decoder 120) to communicate with each other, with the OS, and with other applications (not shown).

The detection unit 575 can perform functions associated with detecting sounds and identifying a source of the sounds, for the source room and the quiet room. The determination unit 580 can perform functions associated with the determination of the sound components, performing the subtraction, and comparing the sound level of the sound in the quiet room from the source room to a threshold. The action unit 585 can perform functions associated with the action based on the trigger.

For example, the detection unit 575, the determination unit 580, and the action unit 585 may implement one or more processes shown above with respect to the structures described above in addition to the method 300 and the method 400. The described units and elements can be varied in design, function, configuration, or implementation and are not limited to the descriptions provided.

In some example implementations, when information or an execution instruction is received by API unit 560, it may be communicated to one or more other units (e.g., logic unit 555, input unit 565, detection unit 575, determination unit 580, and prediction unit 585).

In some instances, the logic unit 555 may be configured to control the information flow among the units and direct the services provided by API unit 560, input unit 565, detection unit 575, determination unit 580, and action unit 585 in some example implementations described above. For example, the flow of one or more processes or implementations may be controlled by logic unit 555 alone or in conjunction with API unit 560.

Figure 6:
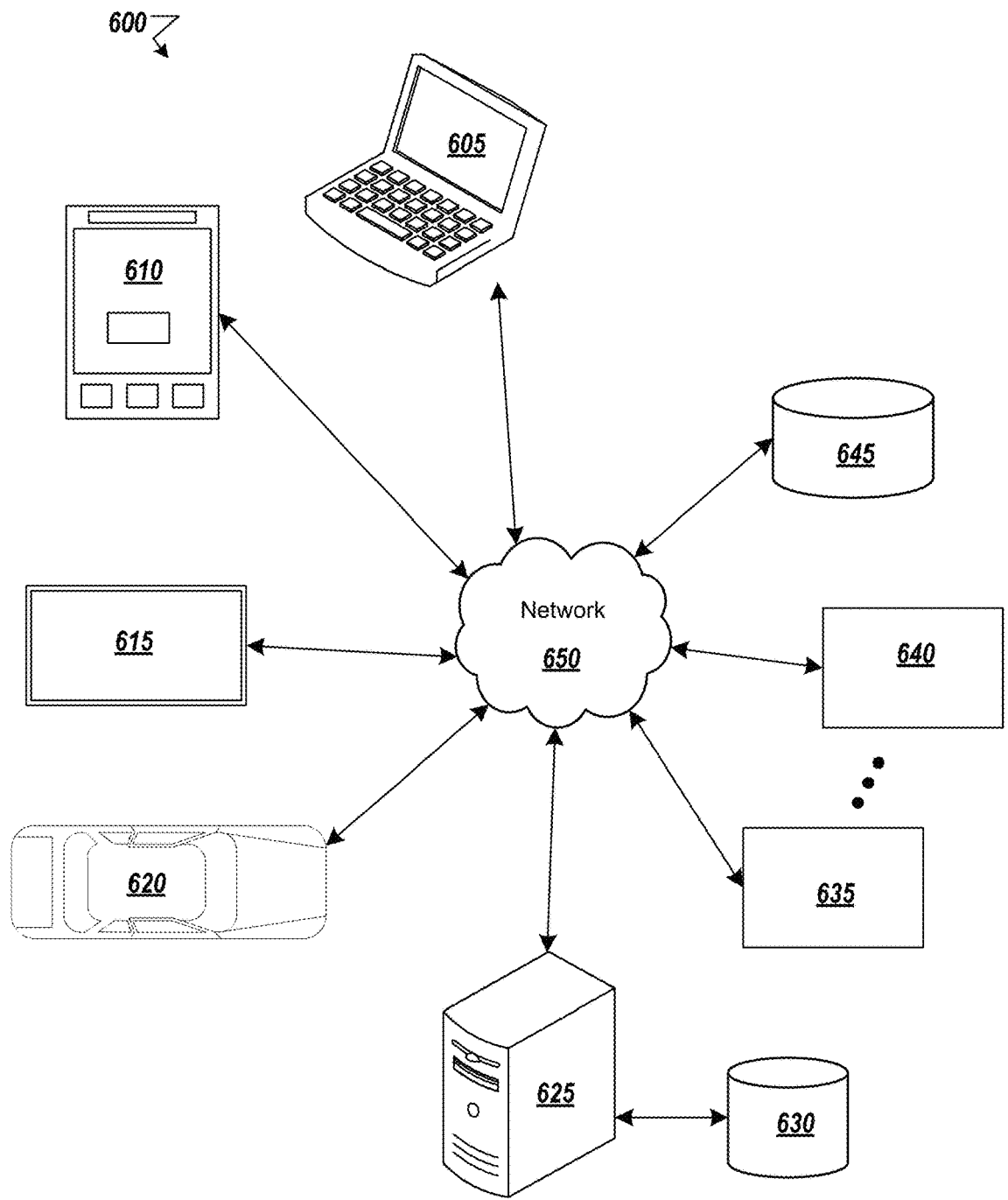
FIG. 6 is a functional block diagram of an exemplary operating environment according to the disclosure.

FIG. 6 is a functional block diagram of an exemplary operating environment according to the disclosure. An environment 600 can be suitable for some example implementations disclosed herein. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing devices 505 described in FIG. 5, respectively. Devices 605-645 may include, but are not limited to, a computer 605 (e.g., a laptop computing device) having a monitor and an associated webcam as explained above, a mobile device 610 (e.g., smartphone or tablet), a television 615, a device associated with a vehicle 620, a server computer 625, computing devices 635-640, storage devices 630 and 645.

In some implementations, devices 605-620 may be considered user devices associated with the users, who may be remotely obtaining a sensed audio input used as inputs for the foregoing example implementations. In the present example implementations, one or more of these user devices 605-620 may be associated with one or more sensors such as microphones in a phone of a user, that can sense information as needed for the present example implementations, as explained above.

While the foregoing example implementations are provided to be indicative of an inventive scope, they are not intended to be limiting, and other approaches or implementations may be substituted or added without departing from the inventive scope. For example, but not by way of imitation, the present example implementations may be employed in the environment of videoconferencing software or systems. According to one example implementation, the source room may be adjacent to the quiet room, which is the room in which the videoconferencing is being conducted.

When the noise in the adjacent room exceeds a threshold level as determined by the software or system of the videoconferencing, such that other remote users are unable to hear the speaker in the quiet room due to the excess background noise from the neighboring room, the videoconference system or software transmits a signal to trigger an action. As a result, the action that is triggered may, for example by way of limitation, provide a mechanism for one or more of the neighboring rooms to reduce the noise level, so that the speaker in the quiet room can participate in the conference.

Conversely, the videoconference room may be characterized as the source room, and the neighboring remain quiet room. Accordingly, if the speaker in the videoconference is speaking too loudly, so as to disturb the person in the room, speaker may be provided with a notification to reduce his or her volume, so as not to disturb the persons in the one or more rooms. In some example intentions, the software system for the videoconference simultaneously consider the location of the speaker of the videoconference as a source room quiet room.

According to another example implementation, the noise may be generated in the source room by appliance. For example and not by way of limitation, a washer or dryer in the laundry room may generate noise. A microphone or sensor in the laundry room may detect the noise or the appliance is a smart connected device that knows its noise level based on its operation. In this scenario, the laundry room is considered the source room. For an adjacent room being the quiet room, if the noise from the laundry room exceeds the threshold, such that the person in the quiet room cannot enjoy the desired activity, such as reading, watching television, listening to music, etc., a threshold may be triggered.

For example, the threshold may be triggered noise exceeds a prescribed level. Alternatively, the user in the quiet room may invoke manual trigger. Accordingly, the appliance may switch to a "quiet" mode, pause operation, automatically close a door to the room, provide white noise or other interference, or take actions as explained above. In this example implementation, the threshold or the appliance may be determined based on the activity being performed in the adjacent quiet room.

Additionally, as explained above, the example implementations may employ smart speakers. However, the present example implementations are not there to, and other devices substituted without departing from the inventive scope. For example, but not by way of limitation, a smart home device employing sensors across a plurality of rooms may centrally control the threshold and actions across a plurality of rooms.

Similarly, for adjacent rooms in an office setting such as conference rooms, this approach may also be employed, with each of the rooms being considered both as a source room and quiet room, and actions being provided in both directions with respect to adjacent rooms.

According to still another example implementation, a calendar or scheduler associated with a user or a particular room may be integrated with the foregoing example implementations. For example but not by way of limitation, when a meeting room is reserved, actions may be taken so as to make it difficult for users in adjacent rooms to be able to hear the conversation in the reserved room. Further, the scheduling function may be provided with information on noise levels adjacent rooms, to provide a recommendation of a meeting time so as to minimize overlap of adjacent rooms.

In the circumstance where side-by-side conference room noise exists, users in either or both of the rooms may be provided with indication that their voice and be heard in the adjacent room. Further, an action may be taken, such as white noise closing the door, providing a notification to the user, etc., so as to aid the user of the conference room in avoiding disclosure of confidential information.

While the environments described herein have been associated with homes and office spaces, the present example limitations are not limited thereto. For example but not by way of imitation, the present example implementations may be employed in a library setting, where it is desired for the rooms to generally be as quiet as possible, and to be able to take action when a source noise can be identified and detected. Similarly, in kiosks or workrooms that are adjacent to one another, such as work offices, cubicles, etc., each of the adjacent rooms may be considered as source and/or quiet room, to implement the foregoing example implementations.

The foregoing example implementations may have various advantages and benefits, although not required. For example not by way of limitation, related art approaches may provide for the setting of a maximum volume and the synchronization of audio playback for individual speakers group speakers, or provide a method to set audio output volume of a smart speaker to match the volume of the input received. However, such related art approaches only provide for a volume control or different applications, and do not a matter of controlling audio in the first space to keep a second space quiet.

Additionally, some related art approaches may adjust equalization across speakers, in a manner that optimizes sound in a room location using a mobile phone. Other related art approaches may sense an acoustic environment of a room, and adjust an output of the speaker optimizes sound quality, and optionally change the direction of sound with a speaker array. However, those related art approaches do not control sound transfer from the first room to a second room, and maintain audio quality in the source room as much as possible, rather than simply silencing the source room.

Further, related art approaches may provide directional audio speakers, including audio, single or multiple beams audio, as well as providing for lower volume in only one direction, such as when a user may be speaking into a smart speaker. However, the related art approaches do not provide a manner of determining and providing feedback between a source room and a quiet room.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:

performing a calibration to estimate transfer of sound between a first room and a second room by generating a test pattern in the first room for various values of volume, frequency and rhythm, and sensing, in the second room, attenuation of the test pattern transmitted from the first room;

detecting, in the first room, a first audio output, the first audio output comprising first audio generated in the first room and a portion of a second audio generated in the second room;

detecting, in the second room, a second audio output, the second audio output comprising a portion of the first audio and the second audio;

for the first room, estimating the first audio generated in the first room by subtracting an attenuated second audio output from the first audio output, the attenuated second audio output determined from an attenuation factor, that is based on the estimate of transfer of sound between the first room and second room, applied to the second audio output;

for the second room, estimating second audio generated in the second room by subtracting an attenuated first audio output from the second audio output, the attenuated first audio output determined from the attenuation factor applied to the first audio output;

estimating the portion of the first audio that is generated in the first room and detected in the second room, estimating the portion of the first audio by subtracting the estimated second audio from the second audio output;

determining whether the estimated portion of the first audio output exceeds a threshold sound level; and for the determining that the estimated portion of the first audio output exceeds the threshold sound level, providing an action to reduce the portion of the first audio output that is detected in the second room.

2. The method of claim 1, wherein the providing the action comprises one or more of providing a notification to a user in the first room to reduce the volume, frequency or rhythm of the first audio output by an amount; automatically adjusting one or more of a maximum volume, bass or treble of the first audio output in the first room; adjusting an equalization of the first audio output in the first room; adjusting an orientation of a directional speaker that generates the first audio output; adjusting a power level or a setting of the first audio output in the first room; or generating white noise generator in the second room to provide an output at a level, so as to reduce a portion of the first audio output detected in the second room.

3. The method of claim 1, wherein the detecting, determining and performing is performed action in a closed loop, until the estimated portion of the first audio output in the second room is below a threshold when one or more connected devices in the first room are a source of the noise.

4. The method of claim 1 wherein providing the action to reduce the estimated portion of the first audio output in the second room is based on detecting a sensing event.

5. The method of claim 1, wherein the threshold sound level is determined by a user in response to an input to a user interface.

6. The method of claim 4, wherein the sensing event comprises one or more of a television in the first room and a conference call in the second room, and the action comprises one or more of and automatically reduce a volume of television during the conference call, and automatically increasing the volume of the television after the conference call has been terminated.

7. A non-transitory computer readable medium including instructions executable on a processor, the instructions comprising:
 performing a calibration to estimate transfer of sound between a first room and a second room by generating a test pattern in the first room for various values of volume, frequency and rhythm, and sensing, in the second room, attenuation of the test pattern transmitted from the first room;
 detecting, in the first room, a first audio output, the first audio output comprising first audio generated in the first room and a portion of a second audio generated in the second room;
 detecting, in the second room, a second audio output, the second audio output comprising a portion of the first audio and the second audio;
 for the first room, estimating the first audio generated in the first room by subtracting an attenuated second audio output from the first audio output, the attenuated second audio output determined from an attenuation factor, that is based on the estimate of transfer of sound between the first room and second room, applied to the second audio output;
 for the second room, estimating second audio generated in the second room by subtracting an attenuated first audio output from the second audio output, the attenuated first audio output determined from the attenuation factor applied to the first audio output;
 estimating the portion of the first audio that is generated in the first room and detected in the second room, estimating the portion of the first audio by subtracting the estimated second audio from the second audio output;
 determining whether the estimated portion of the first audio output exceeds a threshold sound level; and
 for the determining that the estimated portion of the first audio output exceeds the threshold sound level, providing an action to reduce the portion of the first audio output that is detected in the second room.

8. The non-transitory computer readable medium of claim 7, wherein the providing the action comprises one or more of providing a notification to a user in the first room to reduce the volume, frequency or rhythm of the first audio output by an amount; automatically adjusting one or more of a maximum volume, bass or treble of the first audio output in the first room; adjusting an equalization of the first audio output in the first room; adjusting an orientation of a directional speaker that generates the first audio output; adjusting a power level or a setting of the first audio output in the first room; or generating white noise generator in the second room to provide an output at a level, so as to reduce a portion of the first audio output detected in the second room.

9. The non-transitory computer readable medium of claim 7, wherein the detecting, determining and performing is performed action in a closed loop, until the estimated portion of the first audio output in the second room is below a threshold when one or more connected devices in the first room are a source of the noise.

10. The non-transitory computer readable medium of claim 7, wherein providing the action to reduce the estimated portion of the first audio output in the second room is based on detecting a sensing event.

11. The non-transitory computer readable medium of claim 7, wherein the threshold sound level is determined by a user in response to an input to a user interface.

12. The non-transitory computer readable medium of claim 10, wherein the sensing event comprises one or more of a television in the first room and a conference call in the second room, and the action comprises one or more of and automatically reduce a volume of television during the conference call, and automatically increasing the volume of the television after the conference call has been terminated.

13. A system, comprising:
 a first sensor configured to detect a first audio output in a first room, the first audio output comprising first audio generated in the first room and a portion of a second audio generated in a second room;
 a second sensor, in the second room, configured to detect a second audio output, the second audio output comprising a portion of the first audio and the second audio; and
 a processor that:
  performs a calibration to estimate transfer of sound between the first room and the second room by generating a test pattern in the first room for various values of volume, frequency and rhythm, and sensing, in the second room, attenuation of the test pattern transmitted from the first room;
  for the first room, estimates the first audio generated in the first room by subtracting an attenuated second audio output from the first audio output, the attenuated second audio output determined from an attenuation factor, that is based on the estimate of transfer of sound between the first room and second room, applied to the second audio output;
  for the second room, estimates second audio generated in the second room by subtracting an attenuated first audio output from the second audio output, the attenuated first audio output determined from the attenuation factor applied to the first audio output;
  estimates the portion of the first audio that is generated in the first room and detected in the second room, estimating the portion of the first audio by subtracting the estimated second audio from the second audio output;
  determines whether the estimated portion of the first audio output detected by the second sensor exceeds a threshold sound level; and
  for the estimated portion of the first audio output exceeding a threshold sound level, provides an action to reduce the portion of the first audio output that is detected by the second sensor.

14. The system of claim 13, wherein the action comprises one or more of providing a notification to a user in the first room to reduce the volume, frequency or rhythm of the first audio output by an amount; automatically adjusting one or more of a maximum volume, bass or treble of the first audio output in the first room; adjusting an equalization of the first audio output in the first room; adjusting an orientation of a directional speaker that generates the first audio output; adjusting a power level or a setting of the first audio output in the first room; or generating white noise generator in the second room to provide an output at a level, so as to reduce a portion of the first audio output detected in the second room.

15. The system of claim 13, wherein the processor is configured to provide the action to reduce the portion of the estimated first audio output in the second room is based on detecting a sensing event.

16. The system of claim 13, wherein the threshold sound level is determined by a user in response to an input to a user interface.

17. The system of claim 15, wherein the sensing event comprises one or more of a television in the first room and a conference call in the second room, and the action comprises one or more of and automatically reduce a volume of television during the conference call, and automatically increasing the volume of the television after the conference call has been terminated.

* * * * *